J. W. SMITH.
STALK CUTTER.
APPLICATION FILED JUNE 1, 1914.
1,111,925.
Patented Sept. 29, 1914.
2 SHEETS—SHEET 2.
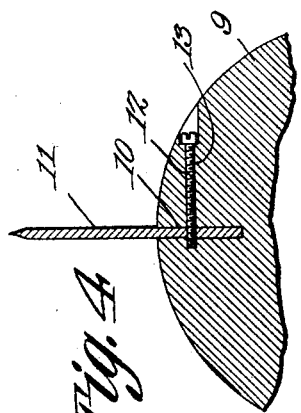
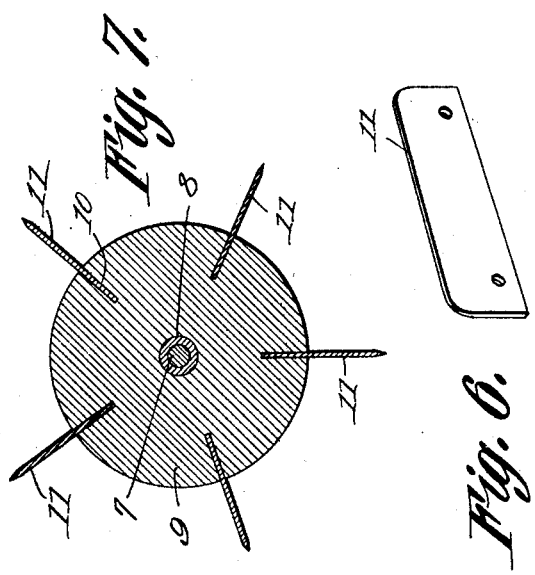
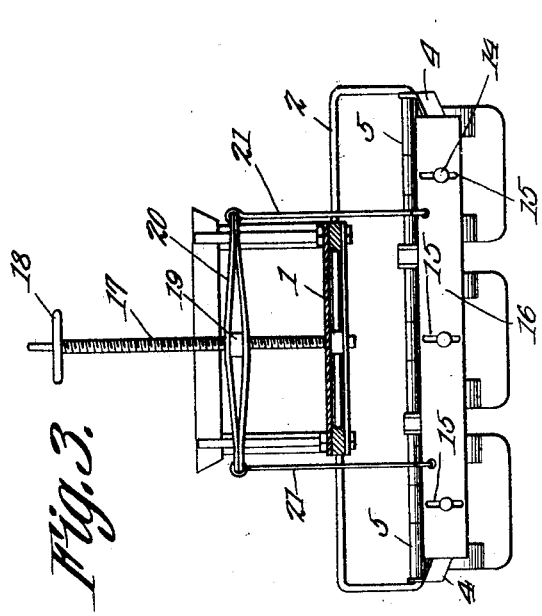
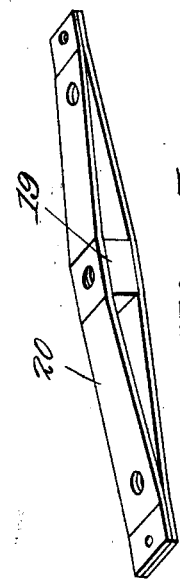
John W. Smith Inventor,
by C. A. Snow & Co.
Attorneys

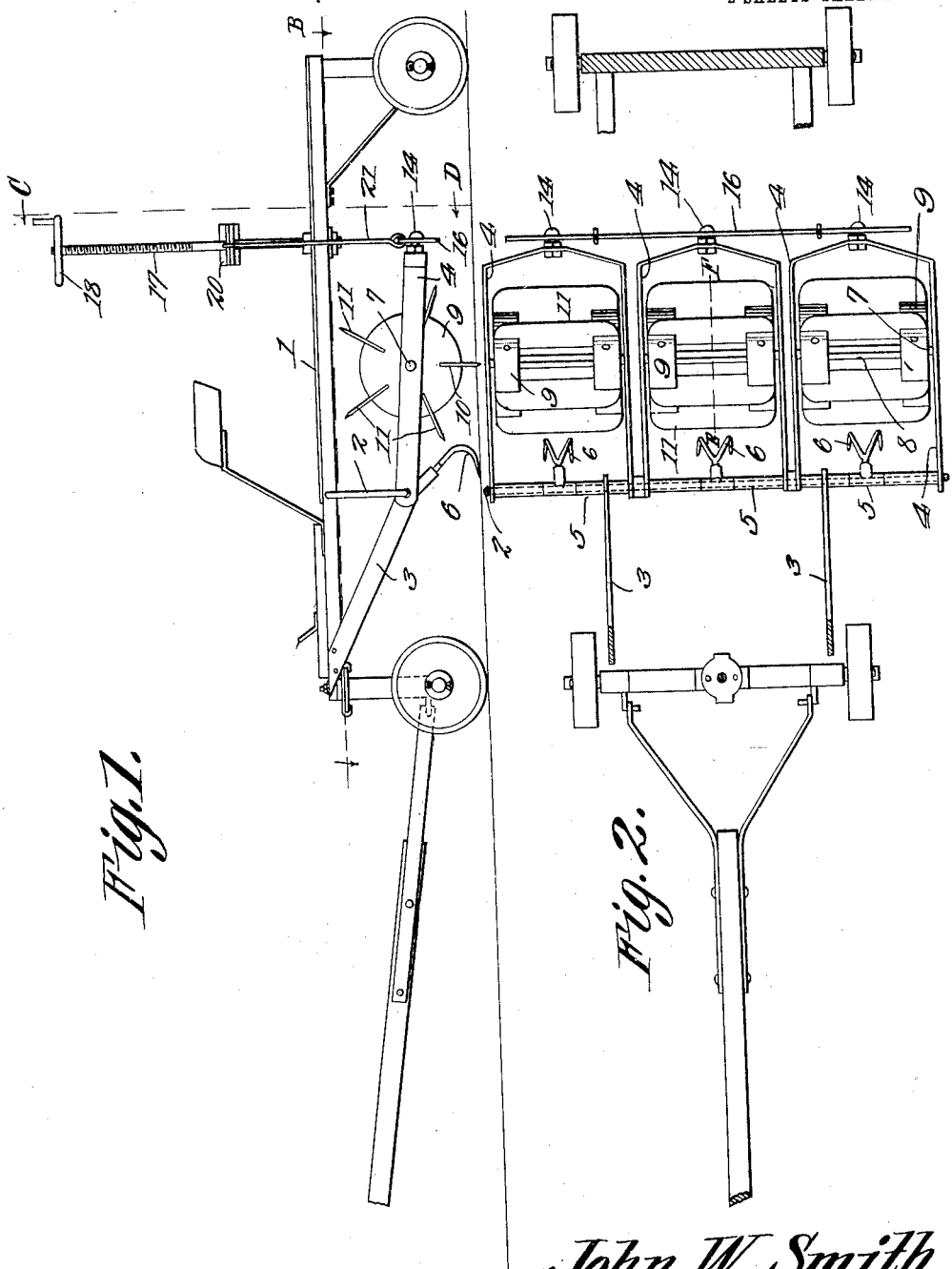

UNITED STATES PATENT OFFICE.

JOHN WESLEY SMITH, OF HUTCHINSON, KANSAS, ASSIGNOR OF ONE-HALF TO ENOCH M. RAMSEY, OF HUTCHINSON, KANSAS.

STALK-CUTTER.

1,111,925.  Specification of Letters Patent. Patented Sept. 29, 1914.

Application filed June 1, 1914. Serial No. 842,174.

*To all whom it may concern:*

Be it known that I, JOHN W. SMITH, a citizen of the United States, residing at Hutchinson, in the county of Reno and State of Kansas, have invented a new and useful Stalk-Cutter, of which the following is a specification.

This invention relates to stalk cutters, one of its objects being to provide a simple and compact machine particularly designed for cutting along three rows of stalks simultaneously.

A further object is to provide cutters capable of moving upwardly and downwardly independently of each other thus to conform to any unevenness of the ground over which the machine is traveling.

Another object is to provide simple and efficient means whereby all of the cutters may be lifted simultaneously out of engagement with the ground.

A further object is to provide simple and efficient means for attaching the blades of the cutters to their holders.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a section on line A—B Fig. 1. Fig. 3 is a section on line C—D Fig. 1. Fig. 4 is an enlarged section through a portion of one of the heads of a cutter and the blade secured therein. Fig. 5 is a perspective view of the cross head of the adjusting mechanism. Fig. 6 is a detail view of one of the cutting blades. Fig. 7 is an enlarged section on line E—F Fig. 2.

Referring to the figures by characters of reference 1 designates a wheel supported platform from which depends a transversely extending frame 2 which extends laterally beyond the sides of the platform and is held against movement relative to said platform by braces 3 extending from the front end portion of the platform downwardly to the bottom of the frame 2. The bottom portion of frame 2 is in the form of a rod or shaft on which are pivotally mounted three similar U-shaped frames 4 extending rearwardly and the ends of each frame 4 which are mounted on the lower part of frame 2 are spaced apart by means of sleeves 5. One of these sleeves has a hooked fork 6 extending downwardly therefrom and designed to drag along the ground for the purpose of straightening out stalks to be cut. This straightening fork is located preferably equi-distant from the sides of frame 4.

Journaled in each frame 4 is a transverse shaft 7 and mounted for rotation on this shaft is a sleeve 8 interposed between and either integral with or separate from circular heads 9 likewise mounted for rotation on the shaft. Each of these circular heads is preferably in the form of a solid metal disk forming a weight and provided with radial slots 10 in its periphery. The slots in the two heads aline so as to constitute seats for the end portions of cutting blades 11, these blades being held in the slots by means of fastening screws 12 insertible into threaded openings 13. These openings extend into the peripheries of the heads 9 and at right angles to the blades 11 so that, when the screws are in position, they extend through openings in the blades. The blades 11 do not extend inwardly to the core 8 but, instead, spaces are formed between the blades and the core as shown in Fig. 7. Thus there is no danger of the cutters becoming clogged by material which might otherwise accumulate between the inner end portions of the blades. Instead any such material will drop through the openings formed between the inner edges of the blades and the core.

As shown in Fig. 2, all of the cutters aline. Each of the frames 4 has a rearwardly extending stud 14, these studs extending through slots 15 formed within a connecting beam 16, located back of the frames. By providing these slots 15 which extend upwardly within the beam, the studs 14 can work up and down, thus permitting the frames 4 to have independent up and down movement.

Swiveled upon the platform 1 at a point above the center of the beam 16 is an upwardly extending adjusting screw 17 provided with a hand wheel 18 or the like whereby it can be rotated readily. This screw extends through a feed nut 19 formed within or secured to the center portion of a cross head 20 arranged transversely above the platform. Hangers 21 extend downwardly from the ends of the cross head and are connected to the beam 16. Thus it will be seen that by rotating the screw 17, beam 16 can be raised or lowered, thereby either lifting the stalk cutters out of contact with the ground or lowering them to active positions.

When the device herein described is drawn forward the hooked forks 6 will gather the stalks and draw them into the paths of the respective cutters. The blades of these cutters are held tightly against the surface of the ground by the heads 9 which, by reason of their size and the material of which they are made, constitute efficient weights. Thus the blades will be caused to cut downwardly through the stalks in the paths thereof. Should the surface of the ground be uneven, frames 4 can move upwardly or downwardly independently of each other.

What is claimed is:—

1. A stalk cutter including a wheel supported platform, a transversely extending series of separately pivoted frames, a cross head, means upon the platform for adjusting the cross head upwardly and downwardly, a cross beam, hangers connecting said cross head to the cross beam, slidable connections between the cross beam and the respective pivoted frames, and a revoluble cutter mounted within each of the said frames.

2. A stalk cutter including a wheel supported platform, a transversely extending series of separately pivoted frames, a cross head, means upon the platform for adjusting the cross head upwardly and downwardly, a cross beam, hangers connecting said cross head to the cross beam, slidable connections between the cross beam and the respective pivoted frames, a shaft within each of the pivoted frames, a cutter mounted for rotation on the shaft, and means in front of each of the cutters for straightening stalks into the path of the cutter.

3. A stalk cutter including a wheel supported platform, a transversely extending series of frames mounted under the platform, said frames being pivotally connected at their front ends to the platform, an upwardly extending adjusting screw mounted for rotation on the platform, a cross head engaged and supported thereby, a cross beam under the platform, hangers connecting the cross head to the cross beam, said cross beam having vertical slots, studs extending from the respective pivoted frames and slidably mounted in the slots, and a revoluble cutter mounted for rotation in each of the pivoted frames.

In testimony that I claim the foregoing as my own, I have hereto affixed my signature in the presence of two witnesses.

JOHN WESLEY SMITH.

Witnesses:
M. A. KESSLER,
CHAS. McGHEE.

---

Copies of this patent may be obtained for five cents each, by addressing the "Commissioner of Patents, Washington, D. C."